United States Patent
Dempsey et al.

(10) Patent No.: US 6,418,540 B1
(45) Date of Patent: Jul. 9, 2002

(54) STATE TRANSFER WITH THROW-AWAY THREAD

(75) Inventors: Peter Allen Dempsey, Convent Station, NJ (US); Daniel John Goudzwaard, Bolingbrook, IL (US); Salvatore John Iaccarino, Ramsey, NJ (US); Stephen L. Kay, Naperville; Andrew Bennett Struble, Woodbridge, both of IL (US); Davinderjit Singh Kohli, Lombard, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/384,602

(22) Filed: Aug. 27, 1999

(51) Int. Cl.[7] .................................................. H04L 1/22
(52) U.S. Cl. ......................................... 714/13; 712/228
(58) Field of Search .............................. 714/13, 15, 20, 714/2, 6, 11, 12, 38; 712/227, 228, 229; 709/108, 200

(56) References Cited

U.S. PATENT DOCUMENTS

| | | | |
|---|---|---|---|
| 4,608,688 A | * 8/1986 | Hansen et al. ................. 371/11 |
| 5,129,080 A | * 7/1992 | Smith .......................... 395/575 |
| 5,687,372 A | * 11/1997 | Hotea et al. ................. 395/675 |
| 5,748,873 A | * 5/1998 | Ohguro et al. .......... 395/182.09 |
| 5,832,283 A | * 11/1998 | Chou et al. ............. 395/750.01 |
| 5,872,909 A | * 2/1999 | Wilner et al. .......... 395/183.14 |
| 5,983,359 A | * 11/1999 | Nota et al. ..................... 714/10 |
| 6,098,169 A | * 8/2000 | Ranganathan ............... 712/227 |
| 6,115,829 A | * 9/2000 | Slegel et al. .................... 714/0 |
| 6,169,726 B1 | * 1/2001 | Dempsey et al. ........... 370/219 |
| 6,189,112 B1 | * 2/2001 | Slegel et al. ................. 714/10 |
| 6,279,119 B1 | * 8/2001 | Bissett et al. ................. 714/12 |
| 6,327,670 B1 | * 12/2001 | Hellenthal et al. ............. 714/5 |

* cited by examiner

Primary Examiner—Nadeem Iqbal
(74) Attorney, Agent, or Firm—Duane, Morris & Heckscher, LLP

(57) ABSTRACT

A computer system comprises an active processor and one or more spare processors. A dummy thread is created on the active processor while the active processor is running a current thread, causing the current thread to become dormant. The operating system of the active processor saves a set of internal state information for the current thread into a first memory coupled to the active processor. Each write to the first memory is duplicated in an equivalent spare memory coupled to each of the one or more spare processors. The dummy thread then activates the spare processor and de-activates the active processor.

18 Claims, 2 Drawing Sheets

STATE TRANSFER WITH THROW-AWAY THREAD

BACKGROUND OF THE INVENTION

1. Field of the Invention

The present invention relates to computer processors and, in particular, to methods for transferring state information from an active processor to a spare processor.

2. Description of the Related Art

Computer processors are used for a wide variety of purposes. In a "sparing scheme," at least two identical processors and related components such as memory are employed. In such a scheme, one processor is active and the spare (or spares) can be used in the event of failure of the active processor, and switched over to periodically to minimize the chance of dual processor failure. Sparing schemes are typically used in systems that requires a high degree of reliability, such as telephony systems. For example, telephone switching or multiplexing components require a high degree of reliability (ability to tolerate faults, or fault tolerance) and thus may employ a sparing scheme. A sparing scheme with one spare processor is said to be 1:1 protected. When more then one (in general, N) spare processors are used, the active processor is N:1 protected.

In some embodiments, the spare processor is switched over to only when necessary, for example when the active processor fails. In other implementations, a spare processor is switched over to periodically to minimize the chance of failure. For example, if a spare is not switched to until the active processor fails, the system is at risk of a dual processor failure (if the spare has already failed or fails at the same time as the active processor). If a spare processor is switched to periodically, a failed spare can be detected, in which case the spare can be repaired and the active processor can remain active, until the spare is repaired or replaced.

When an active processor transfers the active state to a spare, the active processor becomes the spare and vice-versa, until the next such processor switch. Each processor typically includes internal memory (registers) and external memory such as random access memory (RAM). The external RAM and other devices such as hardware are part of the external memory mapping. An active processor is in a particular state at any given moment in time (clock cycle), depending upon the content of all of the memory associated therewith, including the internal registers, and the state of external RAM and other memory mapped devices. The state may be considered to be the combination of the "internal" state and the "external" state, where the internal state is that associated with the contents of internal registers, and the external state is that associated with the contents of external RAM and other memory mapped devices. The internal state includes general purpose registers, the program counter, the stack pointer, and related items not addressable by the external memory mapping. The external state includes the content or states of all units mapped by memory, which includes the external RAM as well as various memory-mapped devices of the processor which are written to with data or instructions.

Therefore, when a spare processor is activated, to pick up processing where the previous active processor left off, it must assume or have the identical state which the previous active processor was in just before the switch, or at the moment of the switch. This means that the internal registers and the external RAM of the spare processor need to have the same information as that stored in the corresponding RAM and registers of the previous or current active processor.

So-called "loosely-coupled" sparing schemes are sometimes employed. In such schemes, the spare processor is fed the same inputs (e.g., commands and outside stimulus) and thus actually executes the same processing so that its state is equivalent to that of the active processor, in some cases with some delay. In this scheme, it is not necessary to copy the state of the active processor's internal registers, because the internal state of the spare presumably mimics that of the active processor (with some delay), because it is running the same program(s) on the same stimulus. However, in a loosely-coupled sparing scheme, the spare processors are not always exactly synchronized with the state of the active processor due to time delays and other data mismatching problems. Moreover, additional code must often be written for the spare processor to account for the fact that it does not have actual control of some external devices. In many places in the code, therefore, the spare processor must know that it is not active, which adds complexity to code design.

"Tightly-coupled" sparing schemes are also sometimes used. In a tightly-coupled sparing scheme, the external RAM of all spare processor are updated each time there is any write to the external RAM of the active processor. Thus, the external RAMs of the spare processors are always in synchronization with the external RAM of the active processor. However, unlike a loosely-coupled sparing scheme, in a tightly-coupled sparing scheme, the spare processors are typically powered off ("asleep"), in order to save power, for example, and thus the spare processor is not operating on the data and its internal state is thus not the same as that of the active processor. The sleep state is sometimes referred to as the low power stopped state.

Therefore, in such a scheme, in order to switch from the current active processor to the spare processor, the internal registers of the spare processor need to be loaded with the identical information stored in the corresponding internal registers of the current active processor. This transfer of memory contents may be referred to as a state transfer, since the (internal) state of a currently active processor is transferred to the spare processor to be activated. Each processor switch in a tightly-coupled sparing scheme thus requires a state transfer.

Unfortunately, it can be difficult to configure a tightly-coupled sparing scheme to copy the state of the internal registers. The sparing scheme must be encoded as part of whatever overall programs are programmed into the processors. The code developer must take into account several factors to ensure that the state transfer (especially of internal register data) is done properly. For example, depending upon the processor architecture, operating system (OS) characteristics, and nature of other programs run on the processor which are part of the code, registers may have to be saved in a particular order to ensure an accurate state transfer, in part because the registers themselves are used during the state transfer, thus complicating the transfer.

Accordingly, it can be difficult to configure the internal state transfer aspect of the code. Further, this difficult and time-consuming programming task may need to be repeated for each new processor, OS, or program employed.

SUMMARY

A computer system comprises an active processor and one or more spare processors. A dummy thread is created on the active processor while the active processor is running a current thread, causing the current thread to become dormant. The dummy thread is a special disposable thread whose only purpose is to hand over control to the spare processor which is to become active. The operating system of the active processor saves a set of internal state information for the current thread into a first memory coupled to the active processor. Each write to the first memory is duplicated in an equivalent spare memory coupled to each of the one or more spare processors. The dummy thread then activates the spare processor and de-activates the active processor. The dummy thread may be discarded without the necessity of saving its internal state information because it is to be discarded after it has performed its sole function of displacing the current thread (causing the current thread's internal state information to be saved) and handing over control the spare processor.

DESCRIPTION OF THE PREFERRED EMBODIMENT

Figure 1:
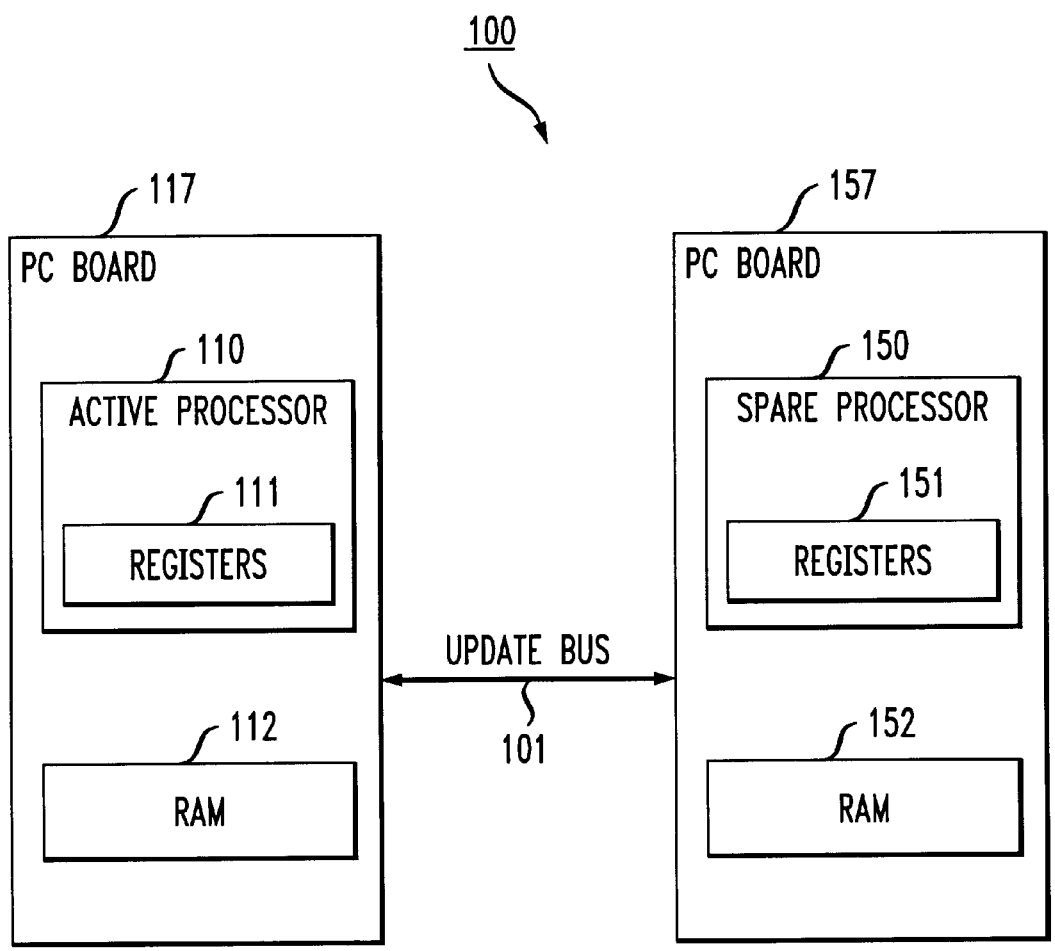
FIG. 1 is a block diagram of a computer system employing a sparing scheme, in accordance with an embodiment of the present invention.

Referring now to FIG. 1, there is shown a block diagram of a computer system 100 employing a sparing scheme, in accordance with an embodiment of the present invention. Computer system 100 comprises at least two processors 110, 150, at least one of which is designated as the active processor; the other(s) are spare processors. As illustrated, processor 110 is initially or currently the active processor, and processor 150 is the spare processor. Each processor 110, 150 comprises internal registers 111, 151, and is coupled to external RAM 112, 152, respectively. Processor 110 and its associated memory 111, 112 may be implemented on a separate PC board 117 from a second PC board 157 which contains processor 150 and its associated memory 151, 152. Processors 110, 150 are intercoupled by some communications channel such as update bus 101. The external RAM associated with or coupled to each processor (e.g., external RAM 112 of processor 110) may be said to be local to its associated processor, since it is accessible by the processor.

In one embodiment, the components of each processor system are identical, and the sparing scheme employed is tightly-coupled. In this scheme, the external states of the two processors are kept synchronized by duplicating all writes to memory mapped locations for active processor 110 in spare processor 150. The memory mapped locations include all external RAM locations as well as all other memory-mapped devices. Additional hardware (not shown) can be used to automatically write data to external RAM 152 whenever data is written to external RAM 112 (or memory-mapped hardware components) by active processor 110, and at the same address. Update bus 101 can carry this data to update external RAM 152. Other data transmitted between the two processors, such as "switch processor" signals which notify a spare to become active and that the current active processor is no longer the active one, may be transmitted via a dedicated interrupt line and/or via update bus 101. Thus, all data written to local external memory 112 or hardware by active processor 110 is written to spare processor 150's memory 152 and hardware at the same time. In one embodiment, update bus is an extension of the processor bus, and crosses the backplane and reaches the spare processor 150. On the spare processor, all of these writes are treated as direct memory access (DMA) requests. Any device that is in the memory map of active processor 110 has a counterpart on spare processor 150 that can be accessed over the update bus.

Thus, at any moment, the external states of the two processors 110, 150 are always identical, i.e. external RAM 152 always has a content identical to that of external RAM 112. When a processor switch is to be made, from active processor 110 to spare processor 150, the state of active processor 110 must be the same as that of spare processor 150. Because the external states are already the same, the only state transfer that needs to be made is an internal state transfer. Thus, the internal registers 151 of spare processor 150 must somehow be loaded with the contents of internal registers 111 of active processor 110 at the time of the processor switch. As will be described below, the internal state transfer that must be made corresponds to the internal state of the current thread running on active processor 110, since the internal states of all other (dormant) threads have already been automatically saved by the OS into RAM 112, and thus also into RAM 152 of the spare processor 150 because all writes to RAM 112 are automatically duplicated in RAM 152.

The sparing scheme of the present invention avoids the above-mentioned coding problems by using the thread-switching mechanism of the OS running on the active processor. In particular, a throw-away thread is used to cause the internal state to be transferred.

As will be appreciated by those skilled in the art, some operating systems implement a model that allows multiple streams of control to exist concurrently within a single defined set of system resources. Such an OS permits multiple threads of execution, where each thread is a single flow-of-control. Each thread may have a given dispatch priority, which determines how much processor time is allocated to the thread relative to other threads. Thus, each thread performs different tasks, and the threads take turns using the resources of the processor, at different priorities.

Each thread possesses a stack and a register state for storing nested function calls and for storing the context (i.e., the internal state for the thread). Part of the internal state information associated with a given thread indicates schedulability information for the thread, such as the thread dispatch priority. The address space in which a thread executes and the resources to which it has access are shared with other threads. Such an OS may be referred to as a "multithreaded" OS. The OS of active processor 110 is a multithreaded OS.

Each thread in a multithreaded OS is presumed to be exactly like the other threads in that OS. Each thread has certain state information that it needs for execution. This information includes a stack pointer, the address of the first instruction to execute, and the state of various flags. Typically the state of the currently running thread is composed of the hardware machine registers, e.g. the contents of registers 111, while the states of the other threads are stored in RAM.

Each thread shares the same address space, descriptors and other resources within the process, but has its own program counter for execution. To achieve concurrency using threads, an application program creates two or more threads within a process to execute different parts of the program within the same process. When a thread is made runnable, it is placed on a dispatch queue, typically at the end, according to its dispatch priority. When a processor switches to a new thread, it always selects the thread at the beginning of the highest priority non-empty dispatch queue. Whichever thread is currently running may be referred to as an active or current thread; other threads are not currently being run on the processor and may be referred to as dormant threads.

A "context switch" occurs whenever a thread must give execution control to another thread; i.e., the current thread becomes dormant and another, dormant thread becomes the new current thread. This can occur during the processing if interrupts occur, if a thread "blocks," or due to the preemption of the execution of the current thread. A context switch requires that all pertinent internal state information about the currently executing thread be saved and the previously-saved internal state information about the new thread be re-loaded.

Normally, when several threads exist, only one of them is active at a time. The states of all other (dormant) threads has already been saved. When their internal states are saved, they are saved in a special location of external RAM 112. These internal state writes to RAM 112 to save the internal state are also duplicated in RAM 152, by automatically making the same write, via DMA request, to a corresponding location of external RAM 152 via update bus 101. Thus, at the moment of a processor switch, spare processor 150 already has access to the internal state information for all of the dormant threads running on active processor 110, and also has access to all external state information associated with active processor 110. However, spare processor 150 does not have access to the internal state information for the current, active thread. In order for spare processor 150 to duplicate the state of active processor 110, it needs access to the internal state information for the current thread so that it can run the current thread.

Figure 2:
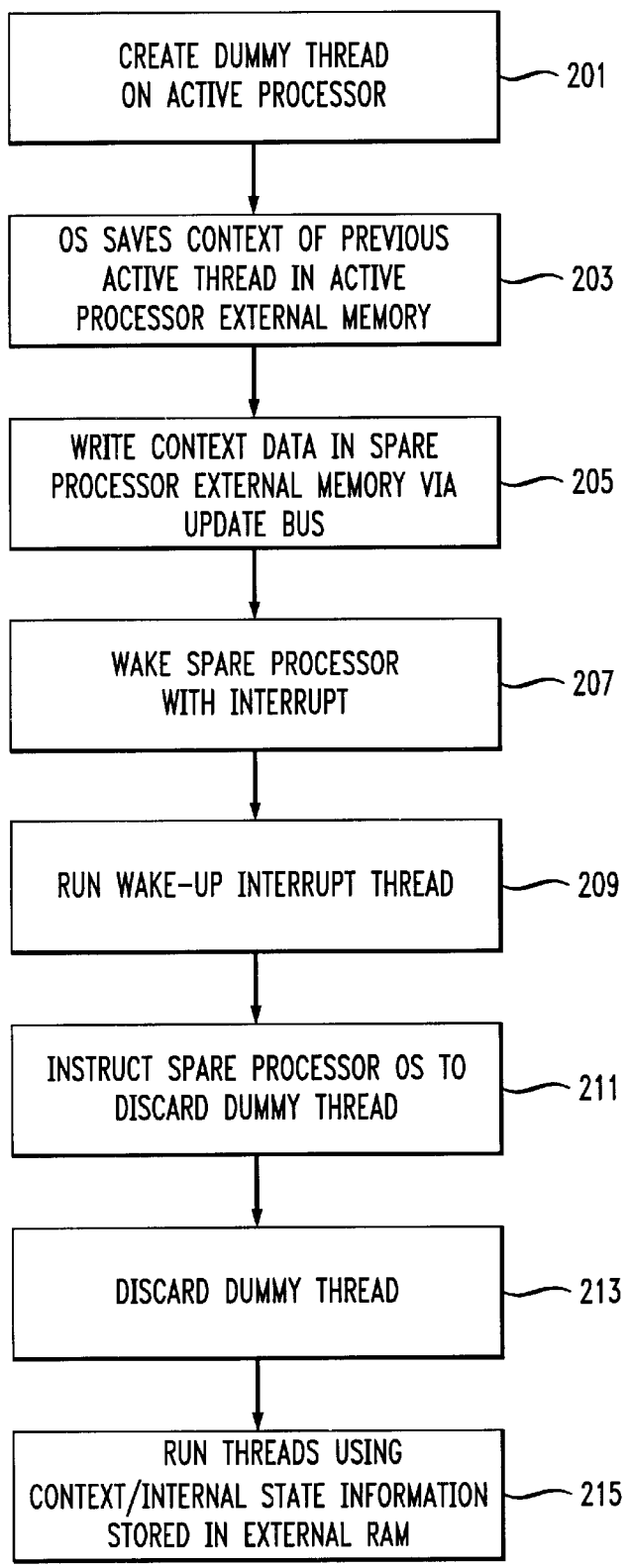
FIG. 2 is a flow chart illustrating a method of switching to a spare processor in the computer system of FIG. 1, in accordance with an embodiment of the present invention.

Referring now to FIG. 2, there is shown a flow chart illustrating a method 200 of switching to a spare processor 150 in computer system 100 of FIG. 1, in accordance with the sparing scheme of the present invention. In the present invention, whenever a processor switch is to be made, an internal state transfer is accomplished in the following manner. First, a "dummy" or throw-away (disposable) thread is created on active processor 110 (step 201). The dummy thread is a special disposable thread whose only function is to hand over control, upon its creation, to the spare processor 150 which is to become active. When the dummy thread is instantiated, the current thread is made dormant. (The current thread made dormant in this fashion by creating the dummy thread will be referred to as the "current thread" even after it is made dormant for ease of description. The dummy thread is referred to as the dummy thread and never as the "current" thread even when it is actually being run on active processor 110.) When the current thread is made dormant, the context (internal state) of the current thread is automatically saved by the OS (step 203). Because this is saved in a specific location of external RAM 112 addressable by the external memory mapping, it is also automatically written into RAM 152 via update bus 101 (step 205). Thus, at this point, spare processor 150 has access, via RAM 152, to the external state information for active processor 110, and all internal state information for all threads (including the "current" thread just displaced by the dummy thread) except for the internal state information for the dummy thread itself which is running on active processor 110.

Next, the dummy thread hands over control (active processor status) to spare processor 150, by sending an appropriate alerting signal, e.g. over a dedicated interrupt line (not shown) or via update bus 101, to spare processor 150 (step 207). At this point, spare processor 150 (which is now the new, active processor 150) has access to the already-saved internal states of all threads formerly running on previous active processor 110, except for the dummy thread. When the spare processor 150 is woken, this causes a special wake-up or interrupt thread to run (step 209). (An interrupt thread is one that automatically runs whenever a sleeping processor is woken up by an interrupt.) The interrupt thread instructs the OS of spare processor 150 (now the new active processor) to discard the disposable dummy thread (step 211). The OS of spare processor 150 removes the dummy thread from its dispatch queue. When the interrupt thread signals that it is done, the OS continues execution of the next priority thread in the dispatch queue, typically the last thread other than the dummy thread that was running on the active processor 110 at the time of the processor switch, i.e. the current thread. Thus, in the present invention, the active processor switches to a dummy processor without the effort of saving and reconstructing the state of a current running thread which would otherwise be required.

Thus, the conventional program-controlled transfer of prior active processor 110's internal state is not needed, because the new active processor 150 does not require the internal state of the dummy thread, since it is not going to be run (i.e., it is discarded). Thus, after the OS discards the dummy thread (step 213), the OS runs the same thread (the current thread) that was displaced by the dummy thread, by using the internal thread state information for threads which have already been stored in external RAM 152 (step 215). The present invention will function with an OS that can block a thread instantly without having to re-visit the stack information of that thread itself, as will be appreciated by those skilled in the art. In such an OS, the OS need not re-visit the stack information for the dummy thread, and thus the dummy thread can be deleted and the memory that represents it freed, and the next thread in the dispatch queue (i.e., the current thread) can be run, which effectively discards the dummy thread. In order to run any dormant thread, the context of the thread is restored by loading all internal registers 151 with the internal state information (context) for the thread to be run. Internal registers 151 are loaded with the internal state information from its previously-saved location in RAM 152. The thread is run once its context has been thus restored.

Thus, the purpose of the dummy thread is to cause the internal state for the current thread to be automatically saved by the OS upon the dummy thread's creation and activation (which causes this internal state information to be also written to RAM 152), and to hand over control to the spare processor to be activated. Because the dummy thread has no remaining function after handing over control to the spare processor (because it was created specifically for this purpose), it need not be run on the spare processor, and may be discarded. Because it may be discarded and is not going to be run on the spare processor, there is no need to restore its context and thus it is not necessary to save its internal state information, and thus there is no need to perform a conventional program-controlled transfer of prior active processor 110's internal state. Thus, the present invention "tricks" the OS into transferring the active processor's internal state to the spare processor by creating a disposable, or throw away, dummy thread. Since the throw-away, dummy thread is "killed" in this switch to new active processor 150, to do a second or Nth switch to yet another processor, a new dummy thread is created and the same processor-switching procedure as described above is followed.

The present invention allows processor-switching and state-transfer aspects of the code running on the processors of system 100 to be reduced because the sparing scheme is tightly-coupled and thus all spare processors are asleep. Further, the use of the disposable thread of the present invention reduces the amount of code needed for the processor switch by exploiting the OS's thread context-saving procedure, and also makes the switch code more portable between processors, operating systems, and programs. This is because the context-saving procedure is performed by a routine command of the OS and is not processor-specific from the application's point of view.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a system comprising an active processor and one or more spare processors, a method for switching from the active processor to one of the spare processors, the method comprising the steps of:
   (a) creating a dummy thread on the active processor while the active processor is running a current thread, wherein creating the dummy thread causes the current thread to become dormant;
   (b) saving, with an operating system of the active processor, a set of internal state information for the current thread in a first memory coupled to the active processor;
   (c) duplicating each write to the first memory in corresponding spare memories coupled to each of the one or more spare processors; and
   (d) activating a spare processor of the one or more spare processors and de-activating the active processor, with the dummy thread.

2. The method of claim 1, wherein step (d) comprises the step of waking up the spare processor from a sleep state with an interrupt.

3. The method of claim 2, comprising the further steps of:
   (e) running an interrupt thread on the spare processor in response to the interrupt;
   (f) instructing an operating system of the spare processor to discard the dummy thread; and
   (g) discarding, with the operating system of the spare processor, the dummy thread.

4. The method of claim 3, comprising the further step of:
   (h) running the current thread on the spare processor using the internal state information for the current thread stored in the spare memory coupled to the spare processor.

5. The method of claim 1, wherein the set of internal state information for a thread corresponds to a context of the thread.

6. The method of claim 1, wherein the first memory is a first external RAM coupled to the active processor and each spare memory is a second external RAM coupled to each said spare processor.

7. The method of claim 1, wherein the active processor comprises a plurality of internal registers the content of which represent an internal state of the active processor, and the set of internal state information for the current thread comprises the internal state of the active processor when the current is running on the active processor.

8. The method of claim 1, wherein:
   the system comprises an update bus which is an extension of the processor bus, wherein the update bus intercouples the first and spare memories; and
   step (c) comprises the step of automatically updating each of the spare memories with the internal state information for the current thread via the update bus by treating writes to the first memory as DMA requests to write identical data to an identical address location of each spare memory.

9. The method of claim 1, wherein the system is tightly-coupled so that each data write by the active processor to a memory-mapped location is automatically duplicated to a corresponding memory-mapped location for each of the one or more spare processors, so that each of the one or more spare processors have external states equivalent to an external state of the active processor, wherein the external state of the active processor is defined by the state of all memory-mapped devices for the active processor, including the first memory.

10. A system comprising:
   (a) an active processor; and
   (b) one or more spare processors, each having a spare memory coupled to said each spare processor, wherein:
      a dummy thread is created on the active processor while the active processor is running a current thread, wherein creating the dummy thread causes the current thread to become dormant;
      an operating system of the active processor saves a set of internal state information for the current thread in a first memory coupled to the active processor;
      each write to the first memory is duplicated in the spare memory corresponding to each of the one or more spare processors; and
      the dummy thread activates a spare processor of the one or more spare processors and de-activates the active processor.

11. The system of claim 10, wherein the spare processor is activated by waking up the spare processor from a sleep state with an interrupt.

12. The system of claim 11, wherein:
   an interrupt thread is run on the spare processor in response to the interrupt;

an operating system of the spare processor is instructed to discard the dummy thread; and the operating system of the spare processor discards the dummy thread.

13. The system of claim 12, wherein the current thread is run on the spare processor using the internal state information for the current thread stored in the spare memory coupled to the spare processor.

14. The system of claim 10, wherein the set of internal state information for a thread corresponds to a context of the thread.

15. The system of claim 10, wherein the first memory is a first external RAM coupled to the active processor and each spare memory is a second external RAM coupled to each said spare processor.

16. The system of claim 10, wherein the active processor comprises a plurality of internal registers the content of which represent an internal state of the active processor, and the set of internal state information for the current thread comprises the internal state of the active processor when the current is running on the active processor.

17. The system of claim 10, wherein:

the system comprises an update bus which is an extension of the processor bus, wherein the update bus inter-couples the first and spare memories; and the spare memory for each spare processor is automatically updated with the internal state information for the current thread via the update bus by treating writes to the first memory as DMA requests to write identical data to an identical address location of each said spare memory.

18. The system of claim 10, wherein the system is tightly-coupled so that each data write by the active processor to a memory-mapped location is automatically duplicated to a corresponding memory-mapped location for each of the one or more spare processors, so that each of the one or more spare processors have external states equivalent to an external state of the active processor, wherein the external state of the active processor is defined by the state of all memory-mapped devices for the active processor, including the first memory.

* * * * *